(12) United States Patent
Doany et al.

(10) Patent No.: US 9,989,702 B2
(45) Date of Patent: Jun. 5, 2018

(54) POLARIZATION ROTATOR FOR SILICON PHOTONICS

(71) Applicant: International Business Machines Corporation, Armonk, NY (US)

(72) Inventors: Fuad E. Doany, Katonah, NY (US); Nicolas Dupuis, New York, NY (US); Benjamin G. Lee, New York, NY (US); Frank R. Libsch, White Plains, NY (US); Jeonghwan Song, Heverlee (BE)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 14/950,359

(22) Filed: Nov. 24, 2015

(65) Prior Publication Data

US 2017/0199330 A1    Jul. 13, 2017

(51) Int. Cl.
*G02B 6/12* (2006.01)
*G02B 6/126* (2006.01)
*G02B 6/122* (2006.01)
*G02B 6/125* (2006.01)
*G02B 6/27* (2006.01)
*G02B 27/00* (2006.01)

(52) U.S. Cl.
CPC ............ *G02B 6/126* (2013.01); *G02B 6/125* (2013.01); *G02B 6/1221* (2013.01); *G02B 6/1228* (2013.01); *G02B 6/2726* (2013.01); *G02B 6/2766* (2013.01); *G02B 27/0012* (2013.01)

(58) Field of Classification Search
CPC ...... G03B 6/125; G03B 6/126; G03B 6/1228; G03B 6/1225; G03B 6/2766; G03B 6/305; G02B 2006/12061; G02B 27/0012
See application file for complete search history.

(56) References Cited

U.S. PATENT DOCUMENTS

| 7,260,282 | B2 * | 8/2007 | Salib ..................... G02F 1/0955 385/11 |
| 7,792,403 | B1 | 9/2010 | Little et al. |
| 8,750,651 | B2 * | 6/2014 | Chen ..................... G02B 6/105 385/11 |

(Continued)

OTHER PUBLICATIONS

US 8,798,407, 08/2014, Alcatel (withdrawn)

(Continued)

*Primary Examiner* — Thomas A Hollweg
*Assistant Examiner* — Mary A. El Shammaa
(74) *Attorney, Agent, or Firm* — Daniel P. Morris, Esq.; Otterstedt, Ellenbogen & Kammer, LLP

(57) ABSTRACT

A photonic waveguide structure for performing polarization rotation includes a first waveguide layer including input and output waveguides. The input and output waveguides are separate and discontinuous structures. The input and output waveguides are configured in the first waveguide layer to have a lateral offset therebetween. The photonic waveguide structure further includes a second waveguide layer including a waveguide structure disposed under or over the first waveguide layer. The waveguide structure includes a polarization conversion region configured within the second waveguide layer to overlap the input or output waveguides in the first waveguide layer.

20 Claims, 4 Drawing Sheets

(56) References Cited

U.S. PATENT DOCUMENTS

| | | | | |
|---|---|---|---|---|
| 8,855,449 B1* | 10/2014 | Roth | ............... | G02B 6/2773 |
| | | | | 385/11 |
| 8,913,854 B2 | 12/2014 | Alcatel | | |
| 8,948,549 B2 | 2/2015 | Picard et al. | | |
| 9,645,312 B2* | 5/2017 | Barwicz | ............... | G02B 6/126 |
| 2004/0165808 A1* | 8/2004 | Lauzon | ............... | G02B 6/126 |
| | | | | 385/11 |
| 2013/0142476 A1* | 6/2013 | Dallesasse | ............... | G02B 6/26 |
| | | | | 385/11 |
| 2014/0133796 A1* | 5/2014 | Dong | ............... | G02B 6/126 |
| | | | | 385/11 |
| 2014/0153862 A1* | 6/2014 | Picard | ............... | G02B 6/1228 |
| | | | | 385/11 |
| 2014/0161384 A1* | 6/2014 | Dwivedi | ............... | G02B 6/1225 |
| | | | | 385/1 |
| 2014/0355928 A1* | 12/2014 | Ouyang | ............... | G02B 6/1225 |
| | | | | 385/11 |
| 2015/0063744 A1 | 3/2015 | Alcatel | | |

OTHER PUBLICATIONS

Hiroshi Fukuda, et al., "Silicon Photonic Circuit with Polarization Diversity," Optics Express, vol. 16, No. 7, Mar. 2008, OSA Publishing, pp. 4872-4880.

* cited by examiner

POLARIZATION ROTATOR FOR SILICON PHOTONICS

STATEMENT OF GOVERNMENT RIGHTS

This invention was made with Government support under Contract No. W911NF-12-2-0051 awarded by the Defense Advanced Research Projects Agency (DARPA). The Government has certain rights in this invention.

BACKGROUND

The present invention relates generally to the electrical, electronic and computer arts, and, more particularly, to optical waveguides.

An optical waveguide is a physical structure that directs (i.e., guides) electromagnetic waves in the optical spectrum. Optical waveguides can be used as components in integrated optical circuits or as a transmission medium in optical communication systems and are generally classified according to their prescribed characteristics, including, for example, geometry (e.g., planar or strip waveguide), material type (e.g., semiconductor, glass, etc.), modal structure (e.g., single-mode or multi-mode) and refractive index distribution (e.g., step or gradient index), among other factors.

Silicon waveguide structures are strongly polarized due, at least in part, to the geometry of the structure. Standard silicon waveguides often exhibit large polarization-dependent attenuation and delay, which result in polarization-dependent loss (PDL) and polarization-dependent wavelength (PDW) shift, respectively, in devices constructed using standard silicon waveguides. Thus, a polarization diversity circuit (PDC) is typically employed to mitigate such PDL and PDW shift. Unfortunately, implementation of certain components of a PDC, such as waveguide-type polarization splitters and polarization rotators, can be challenging at least in part because it is difficult to rotate the optical axis of a planar waveguide. Furthermore, the small size and/or shape of the structure itself create challenges in fabrication of the waveguide.

SUMMARY

Principles of the invention, in accordance with one or more embodiments thereof, provide techniques for forming polarization rotator structures, for use in a polarization diversity circuit (PDC) of a silicon-based optical waveguide, having enhanced transverse mode conversion efficiency, among other benefits.

In one embodiment, a photonic waveguide structure for performing polarization rotation includes a first waveguide layer including input and output waveguides. The input and output waveguides are separate and discontinuous structures. The input and output waveguides are configured in the first waveguide layer to have a lateral offset therebetween. The photonic waveguide structure further includes a second waveguide layer including a waveguide structure disposed under or over the first waveguide layer. The waveguide structure includes a polarization conversion region configured within the second waveguide layer to overlap the input or output waveguides in the first waveguide layer.

In another embodiment, an exemplary method for fabricating a photonic waveguide structure for performing polarization rotation includes the steps of: forming input and output waveguides in a first waveguide layer, the input and output waveguides being configured as separate and discontinuous structures and having a lateral offset therebetween; and forming a waveguide structure in a second waveguide layer, the waveguide structure being disposed under or over the first waveguide layer, the waveguide structure including a polarization conversion region configured within the second waveguide layer to overlap the input or output waveguides in the first waveguide layer.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

Embodiments of the present invention can provide substantial beneficial technical effects. By way of example only and without limitation, one or more embodiments may provide one or more of the following advantages:

- superior transverse mode conversion efficiency (e.g., greater than about 85 percent);
- easy to fabricate using standard integrated circuit processing techniques compared to conventional polarization rotators;
- uses standard films and thicknesses;
- lower insertion loss; and
- more tolerant to variation in dimensions due to fabrication imprecision.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present invention will be described herein in the context of illustrative polarization rotator structures for use in a polarization diversity circuit (PDC) of a silicon-based optical waveguide, and method for fabricating same. It is to be appreciated, however, that the invention is not limited to the specific apparatus and/or methods illustratively shown and described herein. Rather, aspects of the present disclosure relate more broadly to photonic waveguides and methods of fabricating photonic waveguides having enhanced transverse mode conversion efficiency, among other benefits. Moreover, it will become apparent to those skilled in the art given the teachings herein that numerous modifications can be made to the embodiments shown that are within the scope of the claimed invention. That is, no limitations with respect to the embodiments shown and described herein are intended or should be inferred.

Silicon photonics encompasses a broad class of applications of photonic systems in which silicon is utilized as an optical medium. Submicron photonic components can be fabricated from silicon using standard photolithographic techniques (e.g., patterning and etching). Typically, the silicon lies on top of an insulating layer (e.g., silica) which, like its microelectronic counterpart, is often referred to as silicon-on-insulator (SOI). Silicon photonic devices can be made using existing semiconductor fabrication techniques, and because silicon is readily used as a substrate for most integrated circuits, optical and electronic components can be integrated together on the same microchip to create hybrid devices which exploit advantages of both technologies.

In any waveguide where boundary conditions are imposed by a physical structure, a wave of a particular frequency can be described in terms of a transverse mode. Two transverse modes used to characterize a traveling wave are transverse electric (TE) mode, where there is no electric field in the direction of propagation (sometimes called H modes because there is only a magnetic field along the direction of propagation) and transverse magnetic (TM) mode, where there is no magnetic field in the direction of propagation (sometimes called E modes because there is only an electric field along the direction of propagation). In many applications, it is desirable to convert between transverse modes.

Figure 1A:
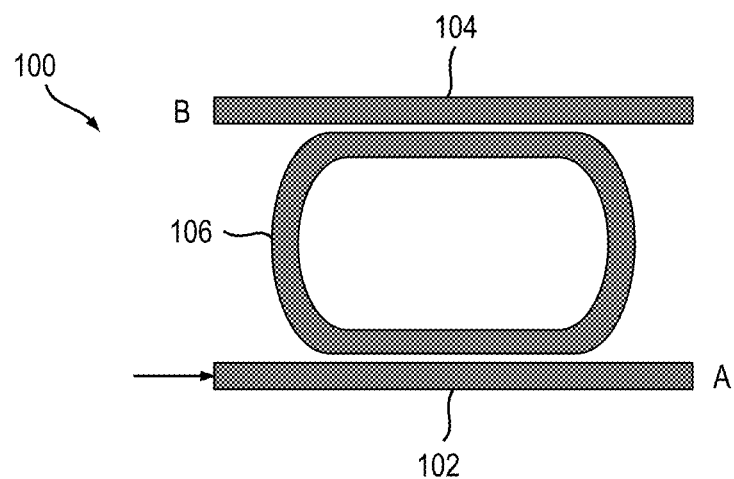
FIGS. 1A and 1B conceptually illustrate an exemplary optical ring resonator and a corresponding graph showing polarization dependence of the ring resonator, respectively.
Figure 1B:
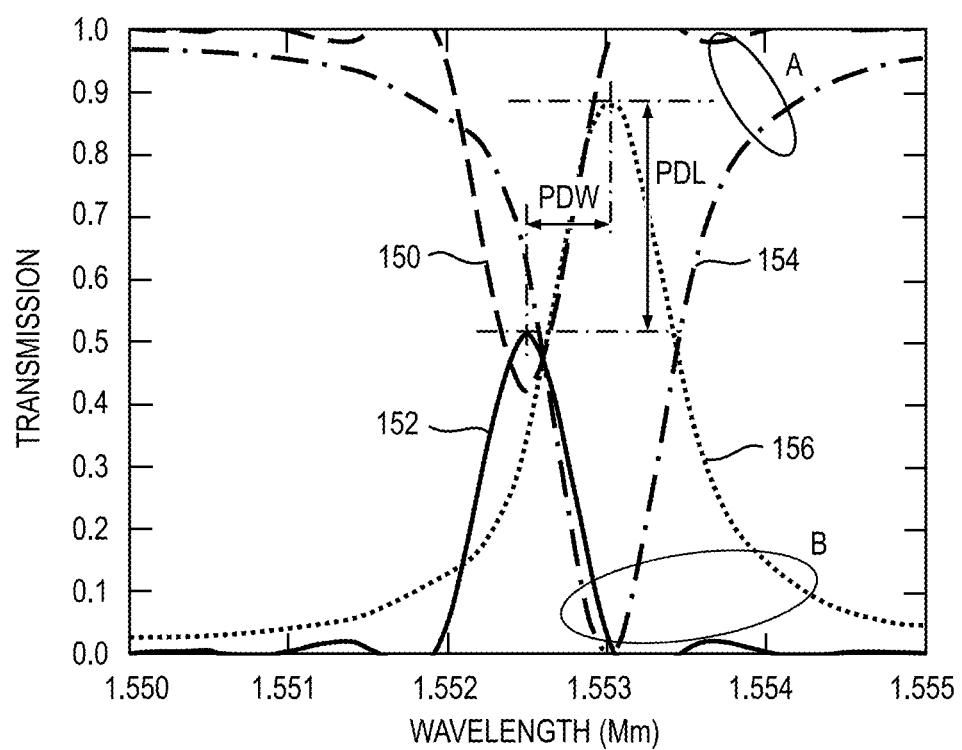

A silicon waveguide is strongly polarized due primarily to the geometry of the structure. As such, polarization dependent loss (PDL), polarization dependent wavelength shift (PDW) and polarization mode dispersion (PMD) attributable to large structural birefringence can significantly degrade performance of the silicon waveguide and devices constructed from it. FIGS. 1A and 1B conceptually illustrate an exemplary optical ring resonator 100 and a corresponding graph showing polarization dependence of the ring resonator, respectively.

With reference to FIG. 1A, the exemplary ring resonator 100 includes a first waveguide 102, which in this illustration is an input waveguide (A), a second waveguide 104, which in this illustration is an output waveguide (B), and a third waveguide 106, which in this illustration is a closed loop. In principle, when light of a resonant wavelength is passed through the loop 106 from the first waveguide 102, it builds up in intensity over multiple round-trips due to constructive interference and is output to the ports designated "A" and "B." Because only certain wavelengths will be at resonance within the loop 106, the optical ring resonator 100 functions essentially as a filter. More particularly, ports "A" and "B" in FIG. 1A are two separate output ports, when light is injected at the location of the arrow into the first waveguide 102. In this configuration, the loop 106 will act as a bandpass filter for light emitted at port "B" and as a notch filter for light emitted at port "A."

FIG. 1B illustrates certain waveforms corresponding to the ring resonator 100 shown in FIG. 1A. Specifically, waveform 150 represents TM mode propagation of the output wave from port "A" as a function of wavelength, waveform 152 represents TM mode propagation of the output wave from port "B" as a function of wavelength, waveform 154 represents TE mode propagation of the output wave from port "A" as a function of wavelength, and waveform 156 represents TE mode propagation of the output wave from port "B" as a function of wavelength. These waveforms demonstrate certain transmission characteristics of the ring resonator 100 of FIG. 1A, including PDL, which is measured as a difference between the peak transmission value of the TE mode output wave 156 and the peak transmission value of the corresponding TM mode output wave 152, and PDW, which is measured as a difference between the wavelengths at which the peak transmission values of the respective TE mode output wave 156 and the TM mode output wave 152 occur.

Figure 2:
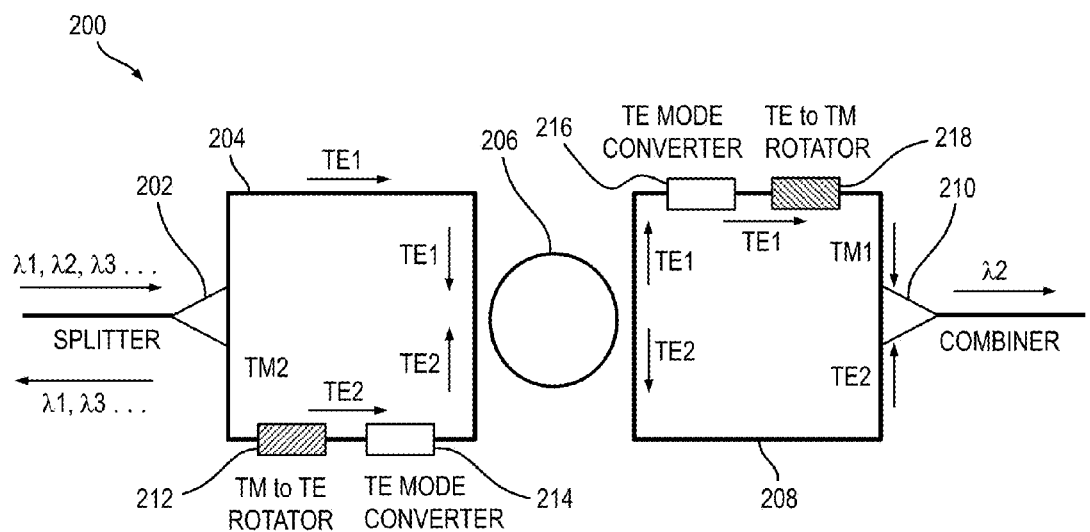
FIG. 2 conceptually depicts an exemplary polarization diversity circuit (PDC) which may be useful with one or more embodiments of the invention.

One approach to help make the silicon waveguide less polarization dependent is to employ a polarization diversity circuit. FIG. 2 conceptually depicts an exemplary polarization diversity circuit (PDC) 200. The PDC 200, in this illustration, includes a polarization splitter 202, a first waveguide 204, which in this illustration is an input waveguide, a second waveguide 206, which in this illustration is a closed loop, a third waveguide 208, which in this illustration is an output waveguide, and a polarization combiner 210. Disposed in a series path within the input waveguide 204 are a first polarization rotator 212 and a first transverse mode converter 214. Likewise, disposed in a series path within the output waveguide 208 are a second transverse mode converter 216 and a second polarization rotator 218. The first polarization rotator 212 is a TM to TE rotator and the second rotator 218 is a TE to TM rotator in this example. The first and second transverse mode converters 214 and 216, respectively, are TE mode converters in this example. A key component of the PDC is the polarization rotator.

Waveguide-type polarization splitters and rotators are problematic to realize, particularly in silicon, since it is difficult to rotate the optical axis of a planar waveguide. To realize a rotation, some specific asymmetrical structures are required, such as, for example, off-axis double cores, cascaded bends, bi-level tapers, stacked waveguides, slanted cores, cores with a cut corner, etc. These problems, among others factors, have made it challenging to fabricate a PDC in silicon.

Figure 3A:
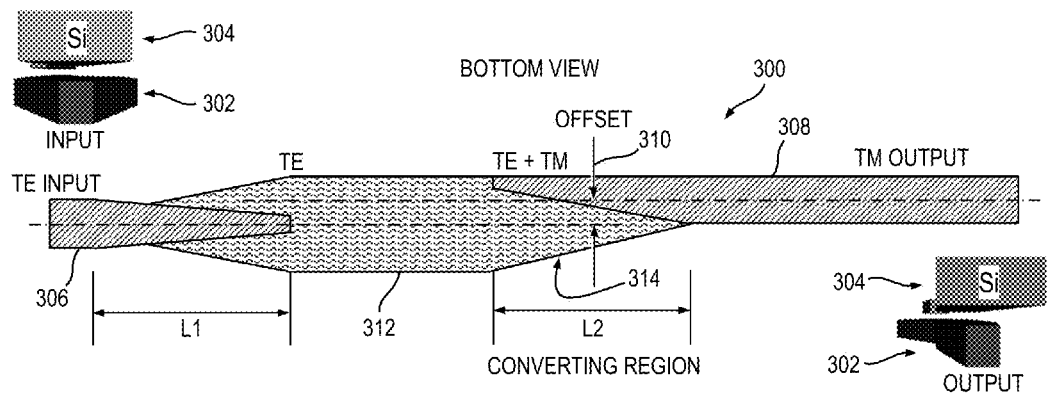
FIGS. 3A through 3C depict bottom, top and side views, respectively, of an exemplary polarization rotator structure suitable for use in a photonic waveguide, according to an embodiment of the invention.
Figure 3B:
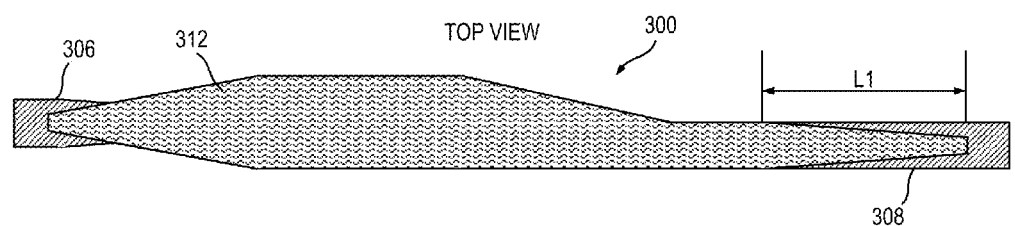
Figure 3C:
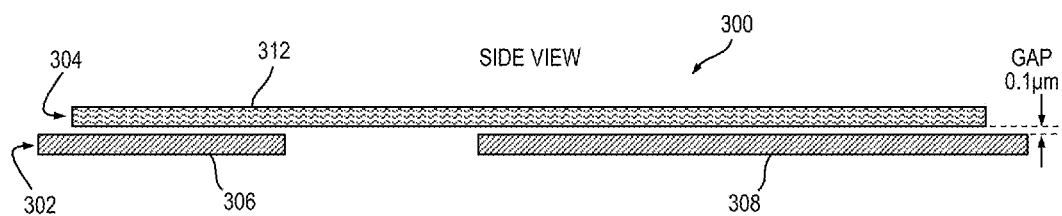

FIGS. 3A through 3C depict bottom, top and side views, respectively, of an exemplary polarization rotator structure 300 suitable for use in a photonic waveguide, according to an embodiment of the invention. This polarization rotator structure 300 is superior to conventional polarization rotators, at least in terms of mode conversion efficiency and/or ease of fabrication. It is to be appreciated that the various layers and/or regions shown in the accompanying figures may not be drawn to scale. Furthermore, one or more semiconductor layers of a type commonly used in such integrated circuit structures may not be explicitly shown in a given figure for ease of explanation. This does not imply that the semiconductor layer(s) not explicitly shown are omitted in the actual structure.

In this illustrative embodiment, the polarization rotator structure 300 includes first and second waveguide layers, 302 and 304, respectively. The first waveguide layer 302 includes an input waveguide 306 and an output waveguide 308, the input and output waveguides being separate and discontinuous structures. That is, the input and output waveguides 306 and 308, respectively, are separate structures that are configured in the first waveguide layer 302 such that respective centerlines of the input and output waveguides have a lateral offset 310 therebetween. In one or more embodiments, the lateral offset is in a range of about 0.25 µm to about 0.30 µm, although the invention is not limited to any specific dimensions of the offset. In fact, this lateral offset, in one or more embodiments, can be selectively varied to optimize a transverse mode conversion efficiency of the polarization rotator structure 300. In one or more embodiments, a preferred range for the offset is 0.25 µm<offset<1 µm, although there is theoretically no fundamental limit to the offset.

The second waveguide layer 304 includes a waveguide structure 312 disposed under or over the first waveguide layer (e.g., the waveguide structure 312 is disposed over the first waveguide layer in this illustrative embodiment). In one or more embodiments, a gap, for example about 0.1 µm, separates the first and second waveguide layers 302, 304. It is to be appreciated that although the gap makes devices impractical at sizes above about 1 µm, the invention is not limited to any specific dimensions of the gap. In one or more embodiments, a preferred range of gap sizes is 0<gap size≤0.25 µm. The gap is preferably filled with silicon dioxide, although embodiments of the invention contemplate other materials used to fill the gap, including, but not limited to, air, another glass, polymers, semiconductor material, etc.

In one or more embodiments, the gap size is determined through numerical simulations (e.g., finite-difference time-domain (FDTD) numerical analysis method). The selected gap size will be dependent on design parameters, materials used, etc. In general, the size of the gap is configured such that it is small enough that light couples from one of the first and second waveguide layers to the other in a reasonable propagation distance, but large enough so as not to incur losses in the abrupt beginning and ending regions of the first and second waveguide layers.

The waveguide structure 312 includes a converting region 314 configured within the second waveguide layer 304 to overlap the input and output waveguides 306, 308 in the first waveguide layer 302; the converting region 314, the region designated "L2," is the location where polarization rotation occurs. The region designated "L1" is a propagation region from the input waveguide 306 to the waveguide structure 312; no polarization conversion occurs in region L1. The waveguide structure 312 initially has the same polarization as the input waveguide 306. Then, polarization rotation occurs in the region L2. At the same time, light is coupled into the output waveguide 308.

Figure 4:
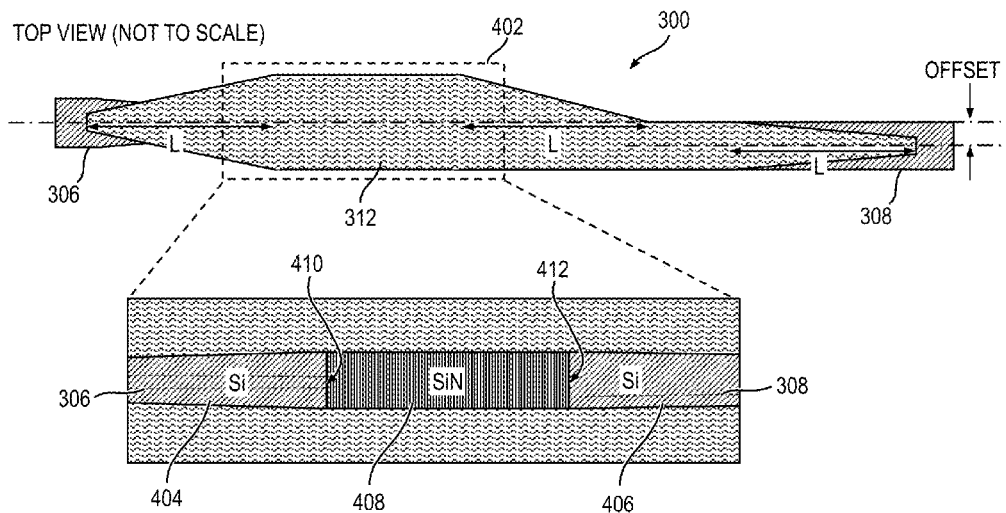
FIG. 4 is a top view of the exemplary polarization rotator structure shown in FIGS. 3A through 3C depicting details of a waveguide structure of the polarization rotator, according to an embodiment of the invention.

FIG. 4 is a top view of the exemplary polarization rotator structure 300 shown in FIGS. 3A through 3C depicting details of the waveguide structure 312 of the polarization rotator, according to an embodiment of the invention. Specifically, in this embodiment the conversion region 402 includes a first waveguide 404 operatively coupled with the underlying input waveguide 306 and configured to receive the input wave. The conversion region 402 further includes a second waveguide 406 operatively coupled with the underlying output waveguide 308 and configured to transmit the output wave. A third waveguide 408 in the conversion region 402 is disposed between the first and second waveguides and is configured to perform a conversion of the input wave from either TE mode to TM mode or from TM mode to TE mode. For this exemplary embodiment, Si is used for waveguides 306 and 308, and SiN is used for waveguides 404, 406, and 408. In one or more other embodiments, each of at least a portion of the input and output waveguides 306, 308 in the first waveguide layer and the waveguide structure in the second waveguide layer comprises at least one of silicon (Si), silicon dioxide ($SiO_2$), silicon nitride (SiN), silicon oxynitride (SiON), polysilicon, and at least one polymer. The polymer is preferably transparent in a prescribed wavelength region of interest. Suitable polymers include, but are not limited to, poly(methyl methacrylate), amorphous fluoropolymer, polystyrene and/or SU-8 epoxy-based negative photoresist. The different materials used for the waveguides are selected based on the fabrication processing dimensions, the index of refraction, and availability, among others.

Figure 5:
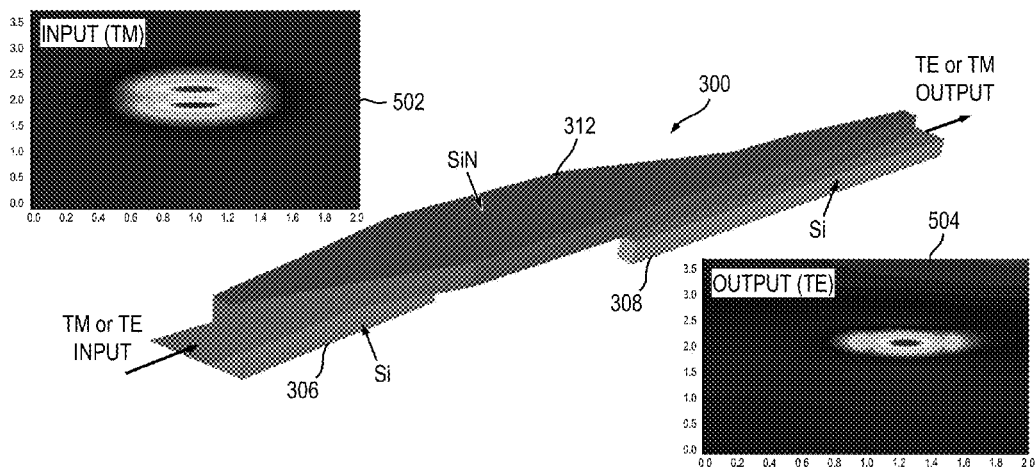
FIG. 5 conceptually depicts an exemplary conversion of an input transverse magnetic (TM) wave to an output transverse electric (TE) wave using the exemplary polarization rotator structure shown in FIGS. 3A through 3C, according to an embodiment of the invention.

FIG. 5 conceptually depicts an exemplary conversion of an input TM wave (contour plot 502) to an output TE wave (contour plot 504) using the polarization rotator structure 300, according to an embodiment of the invention. The dimensions of the x-axis and y-axis of the exemplary contour plots 502, 504 are microns. In this illustrative embodiment, the input and output waveguides 306 and 308, respectively, in the first waveguide layer are formed of silicon (Si), and the waveguide structure 312 in the second waveguide layer is formed of silicon nitride (SiN). It is to be appreciated, however, that embodiments of the invention are not limited to these materials. Other materials which may be used include, for example, Si and $SiO_2$, SiN and $SiO_2$, SiN and SiON, Si and SiON, etc.

With reference again to FIGS. 3A through 3C, certain dimensions of the input and output waveguides 306, 308 of the polarization rotator structure 300 are defined. More particularly, a first dimension, L1, represents a length of a tapered portion of the input waveguide 306, referred to herein as "input taper," and/or a length of a tapered portion of the output waveguide 308, referred to herein as "output taper;" the section of length L2 of the waveguide structure 312 is also referred to herein as the converting region 314, as previously stated. Other dimensions noted in FIGS. 3A through 3C include the lateral offset (Offset) between the input and output waveguides 306, 308, and a gap separating the first and second waveguide layers 302, 304 (0.1 µm in this example). By varying one or more of these dimensions, mode conversion efficiency can be adjusted accordingly as desired; that is, mode conversion efficiency can be optimized or "tuned" by selectively changing one or more dimensions L1, L2, lateral offset and gap size. In one or more embodiments, selection of appropriate dimensions for the polarization rotator structure 300 are determined using optical simulations (e.g., FDTD analysis), although embodiments of the invention are not limited to any specific analysis methods.

By way of example only and without limitation, Table 1 below shows TE to TM conversion efficiency for two illustrative sets of dimensions of the polarization rotator structure 300. For these exemplary sets of dimensions, gap size between the first and second waveguide layers 302, 304 is fixed at 0.1 µm, although other gap sizes are similarly contemplated by embodiments of the invention.

TABLE 1

| Offset | L1 | L2 (optimum) | TE-TM conversion efficiency |
|---|---|---|---|
| 0.25 μm | >80 μm (~5% loss) | 250 μm | 87% |
| 0.30 μm | >80 μm (~5% loss) | 83 μm | 75% |

As evidenced in Table 1 above, the loss associated with the input and output tapers (L1) is small (e.g., about 5%) so long as the length is sufficient (e.g., greater than about 80 μm). For an offset of 0.25 μm, an optimum length of L2 is 250 μm, providing a conversion efficiency of 87%, in this example. Shorter devices can be designed as well (e.g., a length L2 of 83 μm) at the expense of conversion efficiency (75%). In one or more embodiments, optimization of one or more dimensions of the polarization rotator structure includes FDTD simulations with varying parameters (offset, L1, L2).

Figure 6:
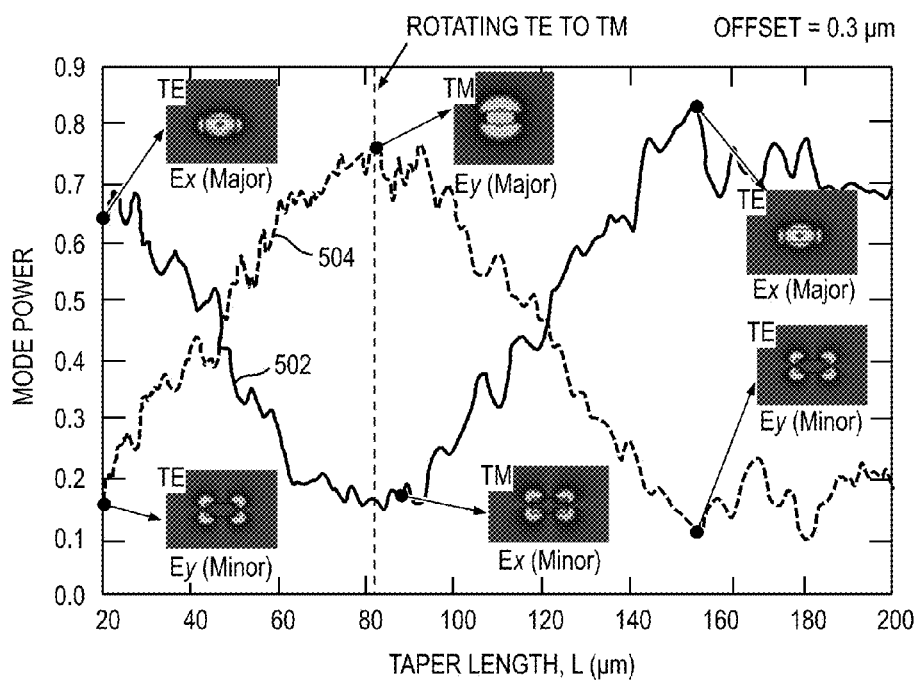
FIG. 6 is a graph which includes exemplary waveforms conceptually illustrating an optimization of the polarization rotator structure shown in FIGS. 3A through 3C for TE to TM mode conversion, according to embodiment of the invention.

FIG. 6 is a graph which includes exemplary waveforms conceptually illustrating an optimization of the polarization rotator structure 300 shown in FIGS. 3A through 3C for TE to TM mode conversion, according to embodiment of the invention. The graph shows an evolution of mode power for various illustrative taper lengths, L2. More particularly, waveform 502 shows the electric field at the output of the polarization rotator structure 300 when a TM mode input is applied. Waveform 504 shows the electric field at the output when a TE mode input is applied.

With reference to FIG. 6, it is apparent that TE mode is composed of Ex major and Ey minor components and TM mode is composed of Ey major and Ex minor components. When TE mode is rotated to TM mode by the rotator, Ex major mode power is decreased and Ey minor mode power is increased. Therefore, the Ey minor mode becomes Ey major mode (TM mode).

Given the discussion thus far, it will be appreciated that an exemplary photonic waveguide structure for performing polarization rotation includes a first waveguide layer, including input and output waveguides, and a second waveguide layer including a waveguide structure disposed under or over the first waveguide layer. The input and output waveguides in the first waveguide layer are separate and discontinuous structures and are configured to have a lateral offset therebetween. The waveguide structure in the second waveguide layer includes a polarization conversion region configured within the second waveguide layer to overlap the input and output waveguides in the first waveguide layer.

Given the discussion thus far, it will be further appreciated that a method of fabricating a polarization rotator structure includes the steps of: forming input and output waveguides in a first waveguide layer, the input and output waveguides being configured as separate and discontinuous structures and having a lateral offset therebetween; and forming a waveguide structure in a second waveguide layer, the waveguide structure being disposed under or over the first waveguide layer, the waveguide structure including a polarization conversion region configured within the second waveguide layer to overlap the input or output waveguides in the first waveguide layer.

At least a portion of the techniques of the present invention may be implemented in an integrated circuit. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Any of the exemplary structures illustrated in the accompanying figures, or portions thereof, may be part of an integrated circuit. Integrated circuits so manufactured are considered part of this invention.

Those skilled in the art will appreciate that the exemplary structures discussed above can be distributed in raw form (i.e., a single wafer having multiple unpackaged chips), as bare dies, in packaged form, or incorporated as parts of intermediate products or end products that benefit from having waveguide structures therein formed in accordance with one or more embodiments of the invention.

An integrated circuit in accordance with aspects of the present disclosure can be employed in essentially any application and/or electronic system involving silicon photonics, particularly applications and/or systems involving polarization diversity circuits in a silicon waveguide. Suitable systems for implementing embodiments of the invention may include, but are not limited to, optical networks, optical processors, etc. Systems incorporating such integrated circuits are considered part of this invention. Given the teachings of the present disclosure provided herein, one of ordinary skill in the art will be able to contemplate other implementations and applications of embodiments of the invention.

The illustrations of embodiments of the invention described herein are intended to provide a general understanding of the various embodiments, and they are not intended to serve as a complete description of all the elements and features of apparatus and systems that might make use of the circuits and techniques described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Terms such as "above" and "below" are used to indicate relative positioning of elements or structures to each other as opposed to relative elevation.

The corresponding structures, materials, acts, and equivalents of all means or step-plus-function elements in the claims below are intended to include any structure, material, or act for performing the function in combination with other claimed elements as specifically claimed. The description of the various embodiments has been presented for purposes of illustration and description, but is not intended to be exhaustive or limited to the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the various embodiments with various modifications as are suited to the particular use contemplated.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A photonic waveguide structure for performing polarization rotation, the structure comprising:
    a first waveguide layer including input and output waveguides, the input and output waveguides being separate and discontinuous structures, the input and output waveguides being configured in the first waveguide layer such that respective centerlines of the input and output waveguides have a lateral offset therebetween; and
    a second waveguide layer comprising a waveguide structure disposed under or over the first waveguide layer, the waveguide structure including a polarization conversion region configured within the second waveguide layer to overlap the input or output waveguides in the first waveguide layer.

2. The photonic waveguide structure of claim 1, wherein each of at least a portion of the input and output waveguides in the first waveguide layer and the waveguide structure in the second waveguide layer comprises at least one of silicon (Si), silicon nitride (SiN), silicon oxynitride (SiON), polysilicon, and at least one polymer.

3. The photonic waveguide structure of claim 2, wherein the at least one polymer is transparent in a prescribed wavelength region of interest.

4. The photonic waveguide structure of claim 2, wherein the at least one polymer comprises at least one of poly (methyl methacrylate), amorphous fluoropolymer, polystyrene and SU-8 epoxy-based negative photoresist.

5. The photonic waveguide structure of claim 1, wherein at least one of an input and an output of the waveguide structure in the second waveguide layer is formed having a taper structure for transitioning an input wave supplied to the photonic waveguide structure between the first and second waveguide layers.

6. The photonic waveguide structure of claim 5, wherein a length of the taper structure forming the output of the waveguide structure in the second waveguide layer is varied to maximize a transverse mode conversion efficiency of the photonic waveguide structure.

7. The photonic waveguide structure of claim 5, wherein a length of a taper structure forming the input of the waveguide structure in the second waveguide layer is the same as a length of a taper structure forming the output of the waveguide structure.

8. The photonic waveguide structure of claim 1, wherein the second waveguide layer is configured as both a transition waveguide and a propagating waveguide.

9. The photonic waveguide structure of claim 1, wherein the first and second waveguide layers are separated from one another by a gap of a prescribed dimension.

10. The photonic waveguide structure of claim 9, wherein a size of the gap is configured such that it is small enough that light couples from one of the first and second waveguide layers to another of the first and second waveguide layers within a prescribed distance, and large enough so as not to incur losses in beginning and ending regions of the first and second waveguide layers.

11. The photonic waveguide structure of claim 9, wherein a size of the gap is about 0.1 micron.

12. The photonic waveguide structure of claim 9, wherein a size of the gap is in a range of about greater than zero to 0.25 micron.

13. The photonic waveguide structure of claim 1, wherein the lateral offset between the input and output waveguides in the first waveguide layer is in a range between about 0.25 micron and 0.30 micron.

14. A method of fabricating a polarization rotator structure for use in a polarization diversity circuit (PDC) of a silicon-based optical waveguide, the method comprising:
    forming input and output waveguides in a first waveguide layer, the input and output waveguides being configured as separate and discontinuous structures, with respective centerlines of the input and output waveguides having a lateral offset therebetween; and
    forming a waveguide structure in a second waveguide layer, the waveguide structure being disposed under or over the first waveguide layer, the waveguide structure including a polarization conversion region configured within the second waveguide layer to overlap the input or output waveguides in the first waveguide layer.

15. The method of claim 14, further comprising configuring the second waveguide layer as both a transition waveguide and a propagating waveguide.

16. The method of claim 14, further comprising separating the first and second waveguide layers from one another by a gap of a prescribed dimension.

17. The method of claim 16, further comprising configuring a size of the gap so that it is small enough that light couples from one of the first and second waveguide layers to another of the first and second waveguide layers within a prescribed distance, and large enough so as not to incur losses in beginning and ending regions of the first and second waveguide layers.

18. The method of claim 14, further comprising forming at least one of an input and an output of the waveguide structure in the second waveguide layer to have a taper structure for transitioning an input wave supplied to the photonic waveguide structure between the first and second waveguide layers.

19. The method of claim 18, further comprising varying a length of the taper structure forming the output of the waveguide structure in the second waveguide layer so as to increase a transverse mode conversion efficiency of the photonic waveguide structure.

20. The method of claim 18, further comprising configuring a length of the taper structure forming the input of the waveguide structure in the second waveguide layer so that it is the same as a length of the taper structure forming the output of the waveguide structure.

\* \* \* \* \*